United States Patent
Park et al.

(10) Patent No.: US 8,243,672 B2
(45) Date of Patent: Aug. 14, 2012

(54) METHOD FOR TRANSMITTING AND RECEIVING SIGNALS IN CONSIDERATION OF TIME ALIGNMENT TIMER AND USER EQUIPMENT FOR THE SAME

(75) Inventors: Sung Jun Park, Anyang-Si (KR); Seung June Yi, Anyang-Si (KR); Young Dae Lee, Anyang-Si (KR); Sung Duck Chun, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/557,249

(22) Filed: Sep. 10, 2009

(65) Prior Publication Data

US 2010/0074202 A1 Mar. 25, 2010

Related U.S. Application Data

(60) Provisional application No. 61/098,727, filed on Sep. 19, 2008, provisional application No. 61/110,955, filed on Nov. 3, 2008, provisional application No. 61/099,190, filed on Sep. 22, 2008.

(30) Foreign Application Priority Data

Jul. 29, 2009 (KR) ........................ 10-2009-0069217

(51) Int. Cl.
*H04W 4/00* (2009.01)
*H04J 1/00* (2006.01)

(52) U.S. Cl. .................. 370/329; 370/331; 370/281

(58) Field of Classification Search .................. 370/336, 370/328, 311, 329, 350, 260, 335; 455/506, 455/502, 13.2, 458, 410, 436; 375/260
See application file for complete search history.

(56) References Cited

U.S. PATENT DOCUMENTS

| 2004/0037224 | A1* | 2/2004 | Choi et al. | 370/235 |
| 2007/0091810 | A1 | 4/2007 | Kim et al. | |
| 2007/0133458 | A1* | 6/2007 | Chandra et al. | 370/329 |
| 2007/0230394 | A1* | 10/2007 | Wang et al. | 370/328 |

(Continued)

FOREIGN PATENT DOCUMENTS

EP 2 015 478 A2 1/2009

(Continued)

OTHER PUBLICATIONS

Ericsson et al: "E-UTRA MAC protocol specification update" 3GPP Draft; R2-083902 E-UTRA MAC Protocol Specification Update, 3GPP Mobile Competence Centre; 650, Route des Lucioles; F-06921 Sophia-Antipolis Cedex; France, No. Jeju; Aug. 12, 2008, XP050319092.

(Continued)

*Primary Examiner* — Kiet Doan

(74) *Attorney, Agent, or Firm* — Birch, Stewart, Kolasch & Birch, LLP

(57) ABSTRACT

A method for transmitting and receiving signals in consideration of a time alignment timer and user equipment (UE) for the same are provided. In this method, a UE performs initial transmission or retransmission of an uplink signal using wireless resources corresponding to an uplink grant signal received from a base station only when a time alignment timer of the UE is running. The UE does not transmit a HARQ feedback signal for a downlink signal received from the base station to the base station when the time alignment timer of the UE is not running.

20 Claims, 8 Drawing Sheets

U.S. PATENT DOCUMENTS

| | | |
|---|---|---|
| 2007/0283032 A1 | 12/2007 | Kim et al. |
| 2008/0273610 A1* | 11/2008 | Malladi et al. ............ 375/260 |
| 2008/0279131 A1* | 11/2008 | Malladi et al. ............ 370/311 |
| 2008/0294958 A1 | 11/2008 | Lee et al. |
| 2009/0122765 A1* | 5/2009 | Dimou et al. ............ 370/336 |

FOREIGN PATENT DOCUMENTS

| | | |
|---|---|---|
| EP | 2 073 415 A1 | 6/2009 |
| EP | 2086258 A1 | 8/2009 |
| EP | 2 124 488 A1 | 11/2009 |
| EP | 2131624 A1 | 12/2009 |
| EP | 2161980 A2 | 3/2010 |
| KR | 10-2003-0087882 A | 11/2003 |
| KR | 10-2004-0031378 | 4/2004 |
| KR | 10-2004-0087657 A | 7/2004 |
| KR | 10-2004-0069570 A | 8/2004 |
| KR | 10-2006-0115498 A | 11/2006 |
| KR | 102007000309 | 1/2007 |
| KR | 10-0800714 B1 | 3/2007 |
| KR | 10-0943590 B1 | 10/2007 |
| KR | 10-2008-0036344 A | 4/2008 |
| KR | 10-2008-0066244 A | 7/2008 |
| WO | WO-2005/112482 A2 | 11/2005 |
| WO | WO-2007/125406 A2 | 11/2007 |
| WO | WO-2008/008924 A2 | 1/2008 |
| WO | WO-2008/107252 A1 | 9/2008 |
| WO | WO-2008/156305 A1 | 12/2008 |
| WO | WO-2009/082668 A1 | 7/2009 |
| WO | WO-2009/096751 A2 | 8/2009 |

OTHER PUBLICATIONS

Qualcomm Europe et al: "Clarifications and Corrections for HARQ operation at TAT expiry and RACH contention resolution" 3GPP Draft; R2-084765 CR 0104 HARQ Operation At TAT Expiry and Contention Resolution, 3GPP Mobile Competence Centre; 650, Route des Lucioles; F-06921 Sophia-Antipolis Cedexl France, No. Jeju; Aug. 22, 2008, XP050319721.

ERICSSON, "Handling of Timing Advance during RA", TSG-RAN WG2 Meeting #62, R2-082736 (update R2-082403), May 5-9, 2008, 4 pages, XP 050140329.

FUJITSU, "TAT expiry during RA procedure", 3GPP TSG RAN WG2 Meeting #62bis, R2-083422, Jun. 30-Jul. 4, 2008, 4 pages, XP050140813.

* cited by examiner

METHOD FOR TRANSMITTING AND RECEIVING SIGNALS IN CONSIDERATION OF TIME ALIGNMENT TIMER AND USER EQUIPMENT FOR THE SAME

CROSS REFERENCE TO RELATED APPLICATIONS

This application claims the benefit of U.S. Provisional Patent Application Nos. 61/098,727, 61/099,190 and 61/110,955, filed on Sep. 19, 2008, Sep. 22, 2008 and Nov. 3, 2008, respectively, which are hereby incorporated by reference as if fully set forth herein.

This application also claims the benefit of Korean Patent Application No. 10-2009-0069217, filed on Jul. 29, 2009, which is hereby incorporated by reference as if fully set forth herein.

BACKGROUND OF THE INVENTION

1. Field of the Invention

The present invention relates to a mobile communication technology, and more particularly, to a method for transmitting and receiving signals in consideration of a time alignment timer and a user equipment for the same.

2. Discussion of the Related Art

3GPP LTE (3rd Generation Partnership Project Long Term Evolution) is briefly described below as an example of a mobile communication system to which the present invention can be applied.

FIG. 1 is a diagram illustrating a network structure of an E-UMTS (Evolved-Universal Mobile Telecommunications System) which is a mobile communication system. An E-UMTS is a system evolving from the conventional universal mobile telecommunication system (UMTS) and its basic standardization is currently handled by the 3GPP. Generally, The E-UMTS may be called a long term evolution (LTE) system.

The E-UMTS network may largely be classified into a UMTS terrestrial radio access network (E-UTRAN) 101 and a core network (CN) 102. The E-UTRAN 101 includes a user equipment (UE) 103, a base station (eNode-B or eNB) 104, and an access gateway (AG) which is located at an end of the network and is connected to an external network. The AG 105 may be classified into a part for handling user traffic and a part for handling control traffic. At this time, an AG for handling new user traffic may communicate with another AG for handling control traffic via a new interface.

At least one cell exists in one eNB. An interface for transmitting user traffic or control traffic may be located between eNBs. The core network (CN) 102 can include a node for user registration of other user equipment (UE) 103 and the AG 105. An interface for discriminating between the E-UTRAN 101 and the CN 102 may also be used.

Layers of a radio interface protocol between a UE and a network can be classified into a first layer L1, a second layer L2 and a third layer L3 based on three lower layers of an OSI (open system interconnection) standard model widely known in communication systems. A physical layer belonging to the first layer L1 provides an information transfer service using a physical channel. A radio resource control (hereinafter, abbreviated as 'RRC') layer located at the third layer plays a role in controlling radio resources between the UE and the network. For this, the RRC layer enables RRC messages to be exchanged between the UE and the network. The RRC layer may distributively be located at network nodes including the eNode B 104, the AG 105 and the like, or may independently be located at either the eNode B 104 or the AG 105.

FIG. 2 and FIG. 3 are diagrams illustrating a structure of a radio interface protocol between a user equipment and UTRAN based on the 3GPP radio access network standard.

The radio interface protocol of FIG. 2 and FIG. 3 is horizontally divided into a physical layer PHY, a data link layer and a network layer, and is vertically divided into a user plane (U-plane) for transmitting data information and a control plane (C-plane) for transmitting control signals. In detail, FIG. 2 illustrates layers of the radio protocol control plane and FIG. 3 illustrates the layers of the radio protocol user plane. The protocol layers of FIG. 2 and FIG. 3 may be divided into a first layer (L1), a second layer (L2) and a third layer (L3) based on the three lower layers of an open system interconnection (OSI) standard model which is well-known in the art of communication systems.

Hereinafter, each layer of the radio protocol control plane of FIG. 2 and the radio protocol user plane of FIG. 3 will be described.

The physical layer PHY, which is the first layer, provides an information transfer service to an upper layer by using a physical channel. The physical layer is connected with a medium access control (MAC) layer located at a higher level through a transport channel, and data between the MAC layer and the physical layer is transferred via the transport channel. At this time, the transport channel is divided into a dedicated transport channel and a common transport channel depending on channel sharing. Between different physical layers, namely, between physical layers of a transmitter and a receiver, data is transferred via the physical channel using radio resources.

Several layers exist in the second layer. First of all, a medium access control (MAC) layer of the second layer serves to map various logical channels with various transport channels. Also, the MAC layer performs multiplexing for mapping several logical channels to one transport channel. The MAC layer is connected with an RLC layer corresponding to its upper layer through the logical channel. The logical channels are divided into control channels and traffic channels depending on types of transmitted information, wherein the control channels transmit information of the control plane and the traffic channels transmit information of the user plane.

The RLC layer of the second layer serves to perform segmentation and concatenation of data received from its upper layer to control a size of the data so that the lower layer transmits the data through a radio link. Also, the RLC layer of the second layer provides three operation modes, i.e., a transparent mode (TM), an unacknowledged mode (UM), and an acknowledged mode (AM) to ensure various quality of services (QoS) required by each radio bearer (RB). In particular, the AM RLC layer performs a retransmission function through automatic repeat and request (ARQ) for reliable data transmission.

In order to effectively transmit data using IP packets (e.g., IPv4 or IPv6) through a radio link with a narrow bandwidth, a PDCP (packet data convergence protocol) layer of the second layer (L2) performs header compression to reduce the size of IP packet header having relatively great size and unnecessary control information. The header compression is to increase transmission efficiency of the radio-communication by allowing only necessary information of a packet header of data to be transmitted. Also, in the LTE system, the PDCP layer performs a security function. The security function includes a ciphering function preventing the third party from performing data monitoring and an integrity protection function preventing the third party from performing data manipulation.

A radio resource control (hereinafter, abbreviated as 'RRC') layer located on the uppermost of the third layer is defined in the control plane only and is associated with configuration, re-configuration and release of radio bearers (hereinafter, abbreviated as 'RBs') to be in charge of controlling the logical, transport and physical channels. In this case, the RB means a logical path provided by the first and second layers of the radio protocol for the data transfer between the user equipment and the UTRAN. Generally, establishing RB means a procedure of defining features of a radio protocol layer and channel required for a specific service and establishing detailed parameters and action methods of the radio protocol layer and the channel. The RB is divided into a signaling RB (SRB) and a data RB (DRB). The SRB is used as a path for transmitting RRC message in a control plane (C-plane), and the DRB is used as a path for transmitting user data in a user plane (U-plane).

As downlink transport channels carrying data from the network to the user equipments, there are provided a broadcast channel (BCH) carrying system information and a downlink shared channel (SCH) carrying user traffic or control messages. The traffic or control messages of a downlink multicast or broadcast service may be transmitted via the downlink SCH or an additional downlink multicast channel (MCH) Meanwhile, as uplink transport channels carrying data from the user equipments to the network, there are provided a random access channel (RACH) carrying an initial control message and an uplink shared channel (UL-SCH) carrying user traffic or control messages.

As downlink physical channels carrying information transferred to a downlink transport channel to a radio interval between a network and a user equipment, there are provided a physical broadcast channel (PBCH) transmitting information of the BCH, a physical multicast channel (PMCH) transmitting information of the MCH, a physical downlink shared channel (PDSCH) transmitting information of the PCH and the downlink SCH, and a physical downlink control channel (PDCCH) (or DL L1/L2 control channel) transmitting information control information provided by the first layer and the second layer, such as downlink or uplink radio resource assignment information (DL/UL scheduling grant). Meanwhile, as uplink physical channels transmitting information transferred to an uplink transport channel to a radio interval between a network and a user equipment, there are provided a physical uplink shared channel (PUSCH) transmitting information of the uplink SCH, a physical random access channel (PRACH) transmitting RACH information, and a physical uplink control channel transmitting control information provided by the first layer and the second layer, such as HARQ ACK or NACK, scheduling request (SR), and channel quality indicator (CQI) report.

In the LTE system described above, a terminal (or UE) can receive timing management information from a base station for uplink signal transmission timing management. Upon receiving the timing management information, the terminal transmits an uplink signal for a predetermined time under the assumption that the uplink signal transmission timing is correct.

However, there is a need to conduct more detailed study on how the terminal operates when a signal requesting uplink signal transmission is received from a base station while the uplink signal transmission timing is incorrect.

There may also be a problem in feedback information transmission when a downlink signal is received from a base station while the uplink signal transmission timing is incorrect.

SUMMARY OF THE INVENTION

Accordingly, the present invention is directed to a method for transmitting and receiving signals in consideration of a time alignment timer and user equipment for the same, which substantially obviates one or more problems due to limitations and disadvantages of the related art.

One object of the present invention is to provide a specific operating method and a specific configuration of a terminal applied in the case where the terminal receives a signal requesting uplink signal transmission from a base station while uplink signal transmission timing of the terminal is incorrect.

Another object of the present invention is to provide a specific operating method and a specific configuration of a terminal applied in the case where the terminal receives a downlink signal from a base station while uplink signal transmission timing of the terminal is incorrect.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a terminal to transmit an uplink signal includes receiving a time alignment command from a base station, running a time alignment timer for a predetermined time after a time at which the time alignment command is received, receiving an uplink grant signal from the base station, and performing initial transmission or retransmission of an uplink signal using wireless resources corresponding to the uplink grant signal only when the time alignment timer is running.

Here, the terminal ignores the uplink grant signal if the time alignment timer is not running when the uplink grant signal is received.

The method may further include re-receiving the time alignment command from the base station and re-running the time alignment timer, re-receiving an uplink grant signal from the base station while the time alignment timer is re-running, and transmitting an uplink signal using wireless resources corresponding to the re-received uplink grant signal.

The uplink grant signal received from the base station may include an uplink grant signal that the base station has actually transmitted and an uplink grant signal that the terminal erroneously detects due to false alarm.

In another aspect of the present invention, a method for a terminal to receive a downlink signal includes receiving a time alignment command from a base station, running a time alignment timer for a predetermined time after a time at which the time alignment command is received, receiving a downlink allocation signal from the base station, receiving a downlink signal through wireless resources corresponding to the downlink allocation signal, and transmitting HARQ feedback information according to a result of the reception of the downlink signal to the base station only when the time alignment timer is running.

Here, the downlink allocation signal may be received through a Physical Downlink Control Channel (PDCCH), and the downlink signal received through the wireless resources corresponding to the downlink allocation signal may be received using a Physical Downlink Shared Channel (PDSCH).

In another aspect of the present invention, a terminal for transmitting an uplink signal includes a physical layer module including a reception module that receives a time alignment command and an uplink grant signal from a base station and a transmission module that performs initial transmission or retransmission of an uplink signal, and a MAC layer module that controls a time alignment timer to run for a predetermined time from a time at which the time alignment command is received by the reception module and controls the transmission module to perform initial transmission or retransmission of the uplink signal using wireless resources corresponding to the uplink grant signal only when the time alignment timer is running.

Here, the MAC layer module may be designed to ignore the uplink grant signal received by the reception module if the time alignment timer is not running when the uplink grant signal is received by the reception module, the MAC layer module may include a HARQ entity and a plurality of HARQ processes managed by the HARQ entity, the MAC layer module may transfer the uplink grant signal received by the reception module to the HARQ entity only when the time alignment timer is running, and the HARQ entity may be designed to cause a HARQ process, corresponding to a time at which the uplink grant signal is received, to transmit the uplink signal through the transmission module.

In another aspect of the present invention, a terminal for receiving a downlink signal includes a physical layer module including a reception module that receives a time alignment command and a downlink allocation signal from a base station and receives a downlink signal from the base station through wireless resources corresponding to the downlink allocation signal and a transmission module that transmits HARQ feedback information according to a result of the reception of the downlink signal, and a MAC layer module that controls a time alignment timer to run for a predetermined time from a time at which the time alignment command is received by the reception module and controls the transmission module not to transmit the HARQ feedback information when the time alignment timer is not running.

Here, the downlink allocation signal may be received through a Physical Downlink Control Channel (PDCCH), and the downlink signal received through the wireless resources corresponding to the downlink allocation signal may be received using a Physical Downlink Shared Channel (PDSCH).

The MAC layer module may not transfer the HARQ feedback information to the physical layer module when the time alignment timer is not running.

The MAC layer module may control the transmission module to perform signal transmission to the base station through an uplink only when the time alignment timer is running.

According to the present invention, a terminal can perform a communication procedure without malfunction in the case where a signal requesting uplink signal transmission and/or a downlink signal is received from a base station while uplink signal transmission timing of the terminal is incorrect.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, although the following description will be given in detail with reference to a 3GPP LTE system as an example of a mobile communication system, the present invention may also be applied to other mobile communication systems, except unique features of the 3GPP LTE.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, "terminal" is used as a general term to describe any mobile or stationary device at the user end such as a User Equipment (UE) or a Mobile Station (MS). In addition, "Base Station (BS)" is used as a general term to describe any node at the network end such as a Node B or an eNode B which communicates with the terminal.

A detailed description will be given of how a terminal operates in the case where the terminal receives a signal requesting uplink signal transmission or a downlink signal from a base station while uplink signal transmission timing of the terminal is incorrect as described above. First, how the terminal generally operates when an uplink (UL) grant signal of the terminal is received will be described below in more detail from a HARQ viewpoint and a random access procedure viewpoint and a time alignment timer for checking the status of uplink time synchronization will also be described in detail.

Figure 1:
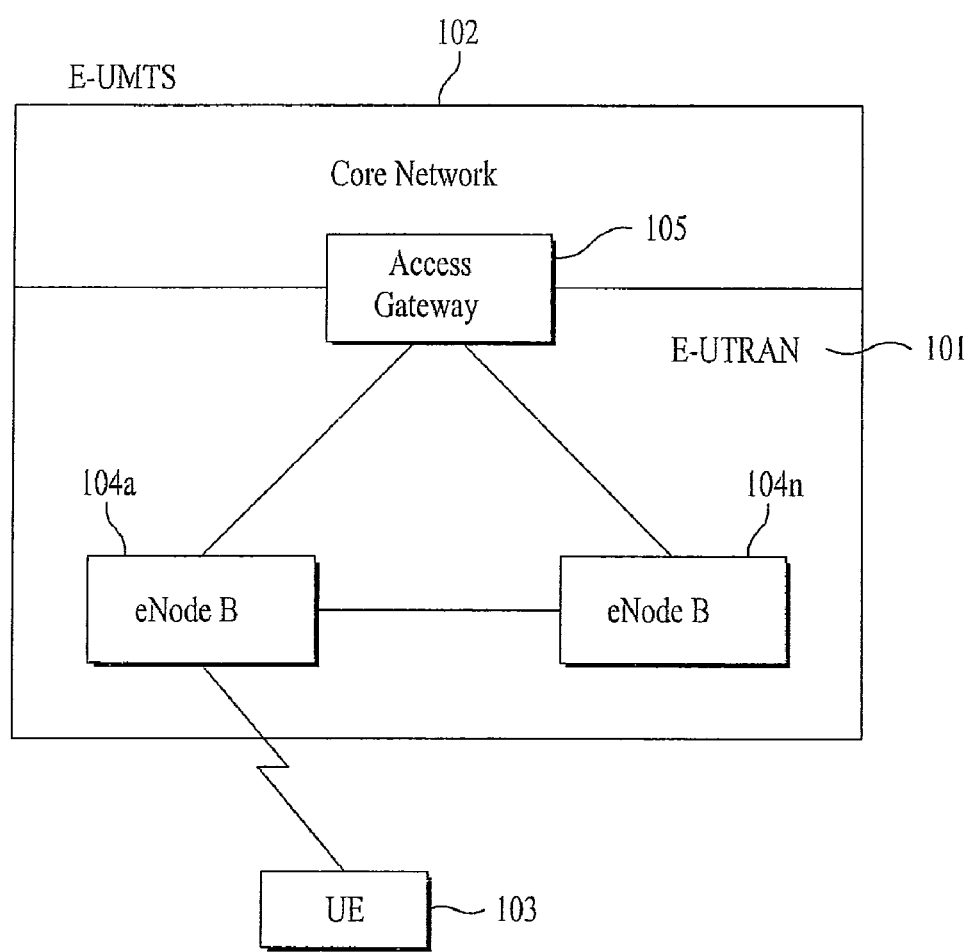
FIG. 1 illustrates a network structure of an Evolved-Universal Mobile Telecommunications System (E-UMTS) which is an example of a mobile communication system.
Figure 2:
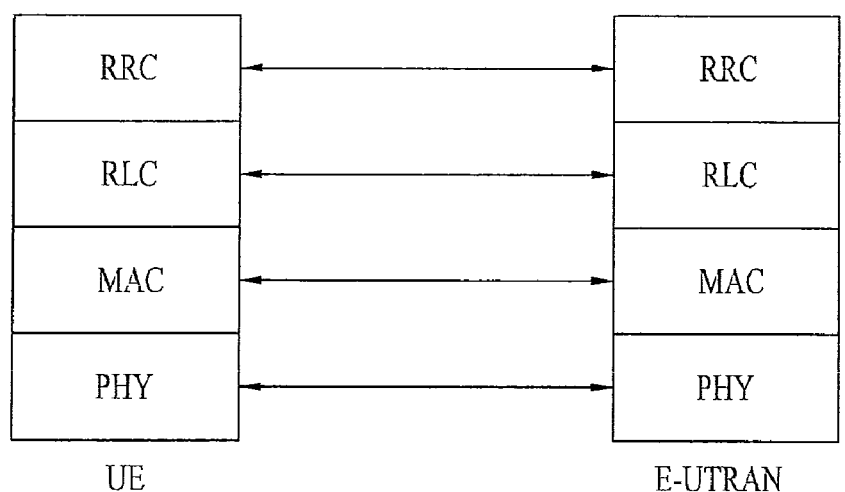
FIG. 2 and FIG. 3 illustrate a structure of a radio interface protocol between a terminal (or user equipment) and a UTRAN based on the 3GPP radio access network standard.
Figure 3:
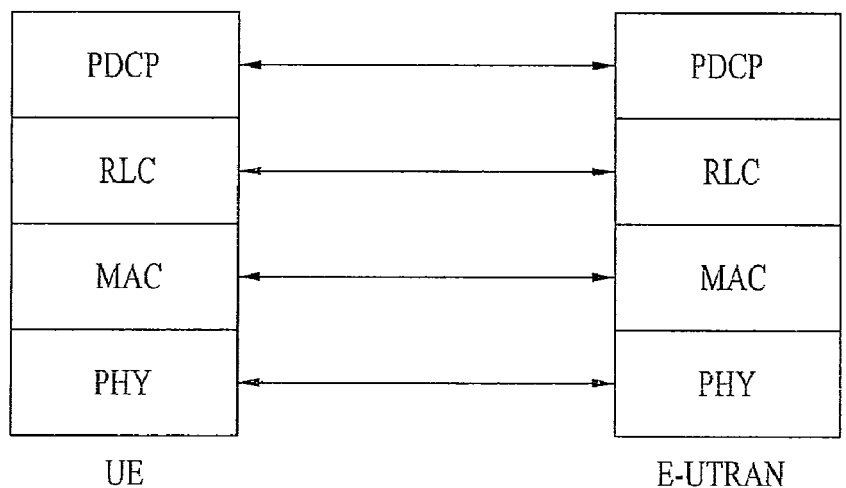
Figure 4:
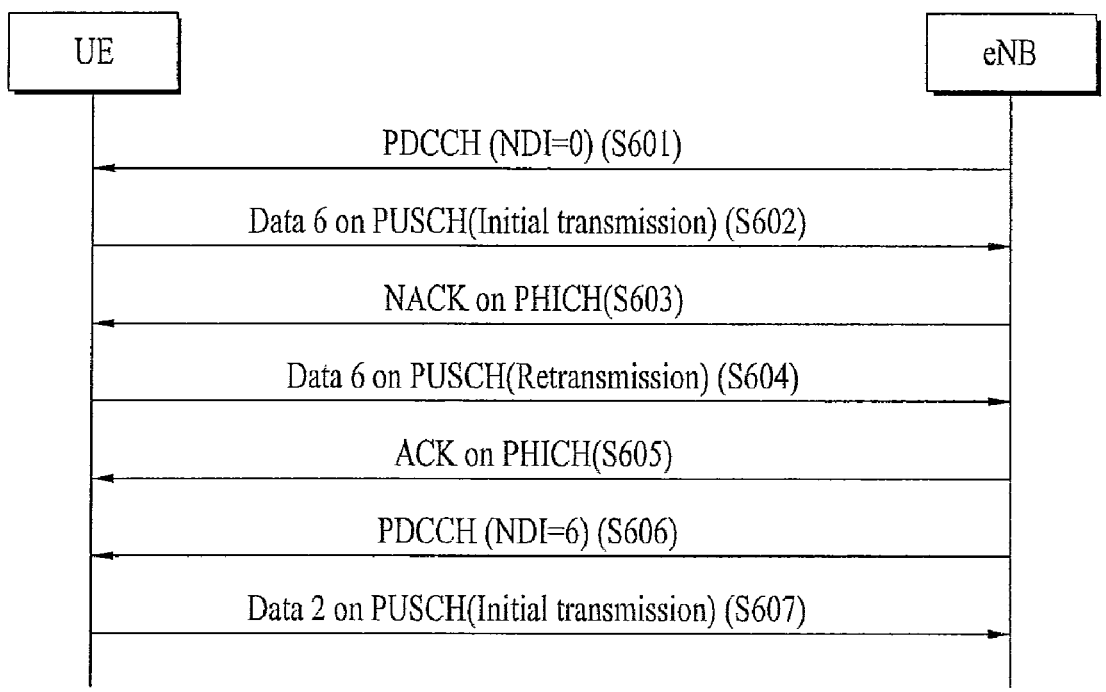
FIG. 4 illustrates an uplink HARQ operation method.

FIG. 4 illustrates an uplink HARQ operation method.

In order to transmit data to a Base Station (BS) ("eNB" in FIG. 4) according to a HARQ scheme, a terminal ("UE" in FIG. 4) may receive uplink (UL) grant information or UL scheduling information through a PDCCH from a BS (step S601). Generally, the UL scheduling information may include a terminal identifier (for example, a C-RNTI or Semi-Persistent Scheduling C-RNTI), the location of allocated wireless resources (for example, a resource block assignment), transmission parameters (for example, modulation, coding scheme, and redundancy version parameters), and an NDI. In the case of an LTE system, a terminal has 8 HARQ processes and the HARQ processes operate synchronously with Transmission Time Intervals (TTIs). That is, specific HARQ processes may be sequentially allocated to respective data reception timings such that HARQ process 1 is used in TTI 1, HARQ process 2 is used in TTI 2, . . . and HARQ process 8 is used in TTI 8, and then HARQ process 1 is used in TTI 9 and HARQ process 2 is used in TTI 10.

Since HARQ processes are allocated synchronously as described above, a HARQ process connected to a TTI in which a PDCCH for initial transmission of specific data has been received is used to transmit the specific data. For example, when it is assumed that a terminal has received a PDCCH including UL scheduling information in an Nth TTI, the terminal transmits data in an N+$4^{th}$ TTI. Specifically, HARQ process K allocated to the N+$4^{th}$ TTI is used to transmit the data. That is, after the terminal monitors a PDCCH in each TTI to check UL scheduling information destined for the terminal, the terminal can transmit data to the BS through a PUSCH according to the UL scheduling information (step S602).

Upon receiving data from the terminal, the BS attempts to decode the data after storing the data in a soft buffer. The BS transmits an ACK signal to the terminal when it has successfully decoded the data and transmits a NACK signal to the terminal when it has failed to decode the data. In the example of FIG. 4, the BS transmits a NACK signal through a Physical HARQ Indicator Channel (PHICH) since it has failed to decode the data (step S603).

When an ACK signal is received from the BS, the terminal determines that the data has been successfully transmitted to the BS and transmits next data. On the other hand, when a NACK signal is received from the BS, the terminal determines that data transmission to the BS has failed and can retransmit the same data in the same format or a new format (step S604).

The terminal may operate in a non-adaptive manner for HARQ retransmission. That is, while the terminal can perform initial transmission of specific data only after receiving a PDCCH including UL scheduling information, the terminal can perform retransmission even when no PDCCH is received. Even when no PDCCH is received, the terminal retransmits the data in the non-adaptive manner using the same UL scheduling information as that of the initial transmission in a next TTI to which the HARQ process is allocated.

The terminal may also operate in an adaptive manner for HARQ retransmission. In this case, transmission parameters for retransmission are received through a PDCCH and UL scheduling information included in the PDCCH may differ from that of the initial transmission according to the channel condition. For example, the UL scheduling information may indicate transmission at a high bit rate if the channel condition is better than in the initial transmission and may indicate transmission at a low bit rate if the channel condition is worse than in the initial transmission.

In the case where the terminal has received UL scheduling information through a PDCCH, the terminal can determine whether data to be transmitted at this time is data for initial transmission or previous data for retransmission using an NDI field included in the PDCCH. The NDI field is toggled, that is, 0->1->0->1 . . . each time new data is transmitted as described above. The NDI field for retransmission has the same value as that of initial transmission. Accordingly, by comparing the value of the NDI field with that of a previously transmitted one to determine whether or not both are equal, the terminal can determine whether data to be transmitted at this time is data for initial transmission or previous data for retransmission.

The terminal increments a transmission count CURRENT_TX_NB by one each time data is transmitted in a HARQ manner and deletes the data stored in a HARQ buffer when the transmission count CURRENT_TX_NB reaches a maximum transmission count set in the RRC layer.

When the BS has received the retransmitted data, the BS combines the received data with data, which has been stored in the soft buffer after decoding thereof has failed, using a variety of methods, and reattempts to decode the data. The BS transmits an ACK signal to the terminal when decoding is successful and transmits a NACK signal to the terminal when decoding has failed. The BS repeats the procedure for transmitting a NACK signal and receiving retransmitted data until decoding of the data is successful.

A random access procedure provided in the LTE system is briefly described below based on the above description.

First, the terminal performs the random access procedure in the following cases.

- In the case where the terminal performs initial access without an RRC connection with the BS.
- In the case where the terminal initially accesses a target cell in a handover procedure.
- In the case where the BS has requested a random access procedure using a command.
- In the case where data to be transmitted in uplink is created when time synchronization of uplink has not been achieved or when designated wireless resources used to request wireless resources have not been allocated to the terminal.
- In the case where a recovery procedure is performed upon radio link failure or handover failure.

In a procedure for selecting a random access preamble, the LTE system provides both a contention-based random access procedure in which a terminal randomly selects and uses one preamble from a specific set of preambles and a non-contention-based random access procedure in which the terminal uses a random access preamble that the BS allocates only to the terminal. The non-contention-based random access procedure may be used only in the handover procedure or when the BS has requested it using a command.

The procedure in which a terminal performs random access to a specific BS may mainly include 1) a step at which the terminal transmits a random access preamble to the BS (which will be referred to as a "first message (message 1) transmission step" when such use does not cause confusion), 2) a step at which the terminal receives a random access response from the BS in response to the transmitted random access preamble (which will be referred to as a "second message (message 2) reception step" when such use does not cause confusion), 3) a step at which the terminal transmits an uplink message using information received in the random access response message (which will be referred to as a "third message (message 3) transmission step" when such use does not cause confusion), and 4) a step at which the terminal receives a message from the BS in response to the uplink message (which will be referred to as a "fourth message (message 4) reception step" when such use does not cause confusion).

During the random access procedure as described above, the terminal stores data to be transmitted through the third message in a Message 3 (Msg3) buffer and transmits the data stored in the message 3 buffer in response to a received uplink (UL) grant signal. The UL grant signal is a signal for notifying the terminal of information of uplink wireless resources that the terminal may use to transmit a signal to the BS. The UL grant signal is received through a random access response message that is received through a PDCCH or a PUSCH in the case of the LTE system.

The following is a more detailed description of the contention-based random access procedure and the non-contention-based random access procedure.

Figure 5:
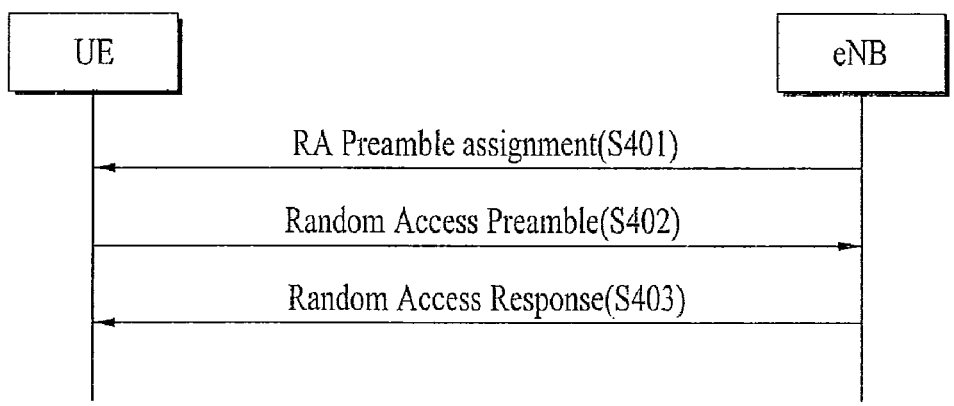
FIG. 5 illustrates a procedure in which a terminal and a Base Station (BS) operate in a non-contention-based random access procedure.

FIG. 5 illustrates a procedure in which a terminal and a BS operate in the non-contention-based random access procedure.

(1) Random Access Preamble Allocation

As described above, the non-contention-based random access procedure may be performed 1) in the case of a handover procedure and 2) in the case where the BS has requested the procedure using a command. Of course, the contention-based random access procedure may also be performed in both cases.

First, for the non-contention-based random access procedure, it is important to receive a specified random access preamble, which has no probability of contention or collision, from the BS. Methods for receiving the random access preamble include a method using a handover command and a method using a PDCCH command. Through these methods, the random access preamble is allocated to the terminal (S401).

(2) First Message Transmission

After the terminal receives the random access preamble designated only for the terminal which the BS allocates to the terminal as described above, the terminal transmits the preamble to the BS (S402).

(3) Second Message Reception

After transmitting the random access preamble at step S402, the terminal attempts to receive a random access response destined for the terminal within a response reception window which the BS has indicated using a handover command or system information (S403). More specifically, the random access response information may be transmitted in a MAC Packet Data Unit (PDU) and the MAC PDU may be transmitted through a Physical Downlink Shared CHannel (PDSCH). It is preferable that the terminal monitor a Physical Download Control CHannel (PDCCH) in order to appropriately receive information transmitted through the PDSCH. That is, it is preferable that the PDCCH include information of a terminal that should receive the PDSCH, frequency and time information of wireless resources of the PDSCH, a transmission format of the PDSCH, etc. When the terminal has successfully received the PDCCH destined for the terminal, the terminal can appropriately receive the random access response that is transmitted through the PDSCH according to the information items of the PDCCH. The random access response may include a random access preamble identifier (ID) (for example, a Random Access Radio Temporary Identifier (RA-RNTI)), a UL grant that notifies the terminal of uplink wireless resources, a temporary cell identifier (for example, a temporary C-RNTI), and a time synchronization correction value (for example, a Timing Advance Command (TAC)).

The reason why the random access preamble identifier is required in the random access response as described above is because it is necessary to indicate a terminal for which the UL grant, the temporary cell identifier, and the TAC are effective since random access response information for more than one terminal may be included in one random access response. At this step, it is assumed that the terminal selects a random access preamble identifier that corresponds to the random access preamble that the terminal selects at step S402.

In the non-contention-based random access procedure, by receiving the random access response information, the terminal may determine that the random access procedure has been performed normally and then may terminate the random access procedure.

Figure 6:
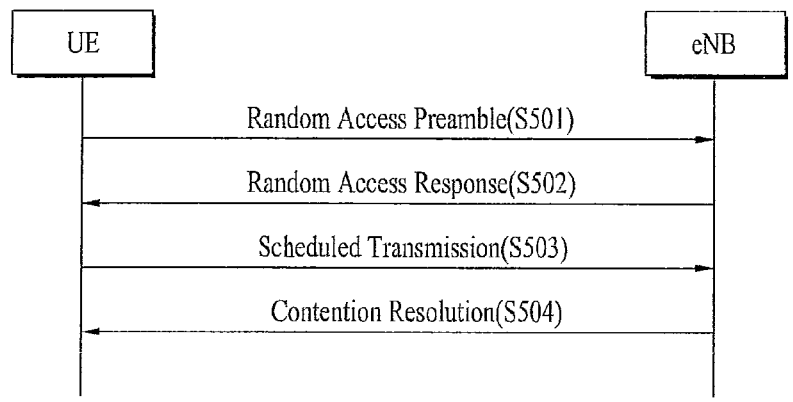
FIG. 6 illustrates a procedure in which a terminal and a BS operate in a contention-based random access procedure.

FIG. 6 illustrates a procedure in which a terminal and a BS operate in the contention-based random access procedure.

(1) First Message Transmission

First, the terminal may randomly select one random access preamble from a set of random access preambles indicated through a handover command or system information, select resources of a Physical RACH (PRACH) capable of transmitting the random access preamble, and transmit the random access preamble through the Physical RACH (PRACH) resources (S501).

(2) Second Message Reception

A method for receiving random access response information is similar to that of the non-contention-based random access procedure. That is, after transmitting the random access preamble as at the above step S501, the terminal attempts to receive a random access response destined for the terminal within a random access response reception window indicated through the handover command or system information, and receives a PDSCH through corresponding random access identifier information (S502). Through the random access response, the terminal can receive a UL grant, a temporary cell identifier (for example, a temporary C-RNTI), and a time synchronization correction value (for example, a Timing Advance Command (TAC)).

(3) Third Message Transmission

When the terminal has received a random access response effective for the terminal, the terminal processes each information item included in the random access response. That is, the terminal applies the TAC and stores the temporary cell identifier. In addition, the terminal may store data to be transmitted in response to the received effective random access response in a message 3 buffer.

On the other hand, the terminal transmits data (i.e., the third message) to the BS using the received UL grant (S503). The identifier of the terminal needs to be incorporated into the third message. In the contention-based random access procedure, the BS cannot determine which terminals perform the random access procedure since it is necessary to identify the terminals in order to resolve contention or collision in the future.

Two methods have been discussed for incorporating the terminal identifier into the third message. In the first method, in the case where the terminal has an effective cell identifier that a corresponding cell has already allocated to the terminal before the random access procedure, the terminal transmits its own cell identifier through an uplink transmission signal corresponding to the UL grant. On the other hand, in the case where the terminal has not received an effective cell identifier allocated to the terminal before the random access procedure, the terminal transmits the third message including a unique identifier (for example, an S-TMSI or a random ID). Generally, the unique identifier is longer than the cell identifier. If the terminal has transmitted data corresponding to the UL grant, the terminal starts a Contention Resolution (CR) timer.

(4) Fourth Message Reception

The terminal awaits an instruction from the BS for contention resolution after transmitting data including its own identifier through a UL grant included in the random access response. That is, the terminal attempts to receive a PDCCH in order to receive a specific message (S504). Two methods have also been discussed for receiving the PDCCH. In the case where the third message transmitted in response to the UL grant includes its own cell identifier, the terminal attempts to receive the PDCCH using its own cell identifier. In the case where the transmitted third message includes a unique identifier, the terminal may attempt to receive the PDCCH using a temporary cell identifier included in the random access response. Thereafter, in the former case, the terminal determines that the random access procedure has been performed normally and terminates the random access procedure if the PDCCH is received through a cell identifier of the terminal before the contention resolution timer expires. In the latter case, the terminal checks data carried in a PDSCH indicated by the PDCCH if a PDCCH is received through a temporary cell identifier before the contention resolution timer expires. The terminal determines that the random access procedure has been performed normally and terminates the random access procedure if its unique identifier is included in the checked data.

The terminal can receive a UL grant signal from the BS in the general HARQ operation procedure or random access procedure as described above and transmits an uplink signal to achieve a specific purpose through wireless resources corresponding to the UL grant signal received from the BS. However, there may be a problem in processing the UL grant signal received from the BS in the case where uplink time synchronization has not been achieved as described above. For a detailed discussion of this problem, the following description is given of timing alignment maintenance in uplink in the LTE system.

In an LTE system which is based on Orthogonal Frequency Division Multiplexing (OFDM) technologies, there is a possibility that a UE may cause interference to communication of other users in a procedure in which the UE performs communication with a BS. To minimize such interference effects, it is very important for the BS to maintain or manage transmission timing of the terminal.

More specifically, the terminal may be present in any region in the cell, which indicates that the time required for data transmitted from the terminal to arrive at the BS may vary according to the location of the terminal. That is, the time required for data transmitted from a terminal located at the edge of the cell to arrive at the BS will be longer than the time required for data transmitted from a terminal located at the center of the cell to arrive at the BS. On the other hand, the time required for data transmitted from a terminal located at the center of the cell to arrive at the BS will be shorter than the time required for data transmitted from a terminal located at the edge of the cell to arrive at the BS. Since the BS should be able to receive signals or data transmitted by all terminals in the cell within every time boundary in order to avoid interference effects, the BS should appropriately control the transmission timing of the terminal according to the condition of the terminal. This control is referred to as "timing alignment maintenance" or "time synchronization management".

The random access operation may be used as one timing alignment maintenance method. That is, through the random access operation procedure, the BS receives a random access preamble transmitted by the terminal and calculates, using information of reception of the random access preamble, a time synchronization value to advance or delay the transmission timing of the terminal. Then, the BS notifies the terminal of the calculated time synchronization value through a random access response and the terminal updates the transmission timing using the time synchronization value.

In another method, the BS receives a sounding reference signal that the terminal periodically or randomly transmits and calculates a time synchronization value of the terminal through the received signal and notifies the terminal of the calculated time synchronization value. Accordingly, the terminal updates its transmission timing.

As described above, the BS may measure transmission timing of the terminal through a random access preamble or a sounding reference signal, calculates a timing value for correction, and then may notify the terminal of the calculated correction timing value. The time synchronization value that the BS transmits to the terminal in this procedure is generally referred to as a "timing alignment command", which is simply referred to as a "TAC" for short in the following description. The TAC is generally processed in the MAC layer of the terminal.

On the other hand, since the terminal is not always located at a fixed position, the transmission timing of the terminal changes in each transmission according to the moving speed or location of the terminal. Taking into consideration this fact, when a TAC is received once from the BS, the terminal should assume that the time during which the TAC is valid is limited, i.e., the TAC is valid only for a specific time. To accomplish this, the terminal according to the LTE system uses a "timing alignment timer", which is simply referred to as a "TAT" for short in the following description. That is, the terminal starts the TAT upon receiving a TAC from the BS. The terminal assumes that the terminal is in time synchronization with the BS only when the TAT is running. The TAT value may be transmitted to the terminal through an RRC signal such as radio bearer reconfiguration or system information. In addition, the terminal restarts the TAT if a new TAC is received from the BS while the TAT is running. In the LTE system, when the TAT has expired or when the TAT is not running, the terminal assumes that the terminal is not in time synchronization with the BS and does not transmit any uplink data or control signal (for example, a PUSCH or PUCCH), except a random access preamble. However, in the case where such a TAT is used, it is necessary to clearly define how the terminal operates when a UL grant signal is received from the BS while the TAT is not running.

Figure 7:
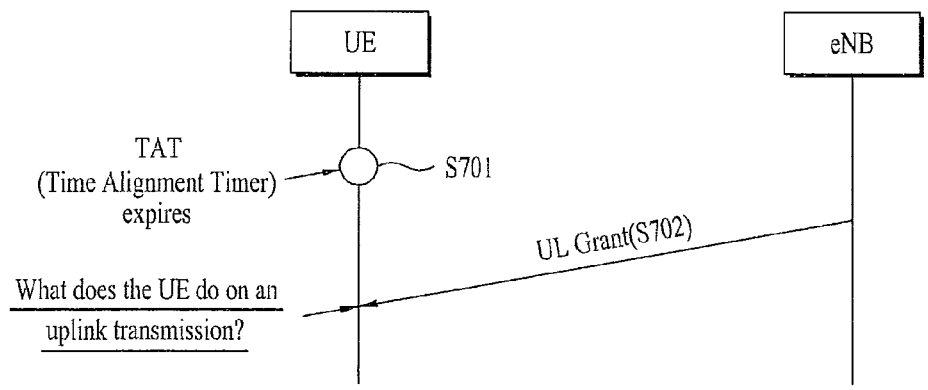
FIG. 7 illustrates a problem that occurs in the case where a terminal receives a UL grant signal from a BS while a TAT of the terminal is not running.

FIG. 7 illustrates a problem that occurs in the case where a terminal receives a UL grant signal from a BS while a TAT of the terminal is not running.

As shown in FIG. 7, the TAT of the terminal (UE) expires at step S701. That is, the terminal starts or restarts the TAT at the time when the terminal receives a TAC from the BS (eNB) and runs the TAC for a predetermined time from that time. The TAT of the terminal expires if a new TAC is not received until the predetermined time elapses. In this state, the terminal may receive a UL grant signal from the BS (S702). Generally, the UL grant signal may be received through a PDCCH or through a random access response message in a PDSCH in a random access procedure. However, in the example of FIG. 7, the TAT expires since the predetermined time has elapsed after the time at which the terminal receives the TAC through the random access response message and thus it is assumed here that the UL grant signal is received through a PDCCH at step S702.

The terminal, which has received a UL grant signal from the BS while the TAT is not running, may operate according to the following scenarios (or schemes).

(1) A scheme in which the terminal initiates a random access procedure when a UL grant signal is received from the BS at step S702.

(2) A scheme in which the terminal ignores all grant signals receives while the TAT is not running.

Here, it should be noted that the random access procedure initiated in scenario (1) is a random access procedure that a MAC sub-layer of the terminal internally starts according to the UL grant signal received at step S702 and is different from a random access procedure that is initiated according to a PDCCH indicated by the BS. According to an embodiment of the present invention, it is assumed in both the cases of the two scenarios that the terminal performs uplink signal (UL-SCH) transmission according to the UL grant signal received from the BS only when the TAT of the terminal is running.

Such scenarios can be mainly discriminated according to whether or not the terminal initiates the random access procedure according to the UL grant signal received at step S702. This is because the only uplink signal that the terminal can transmit to the BS while the TAT is not running in the LTE system is a random access preamble message for initiating a random access procedure.

First, a more detailed description is given of a subsequent procedure that is performed when the terminal has initiated a random access procedure according to the UL grant signal received at step S702.

Figure 8:
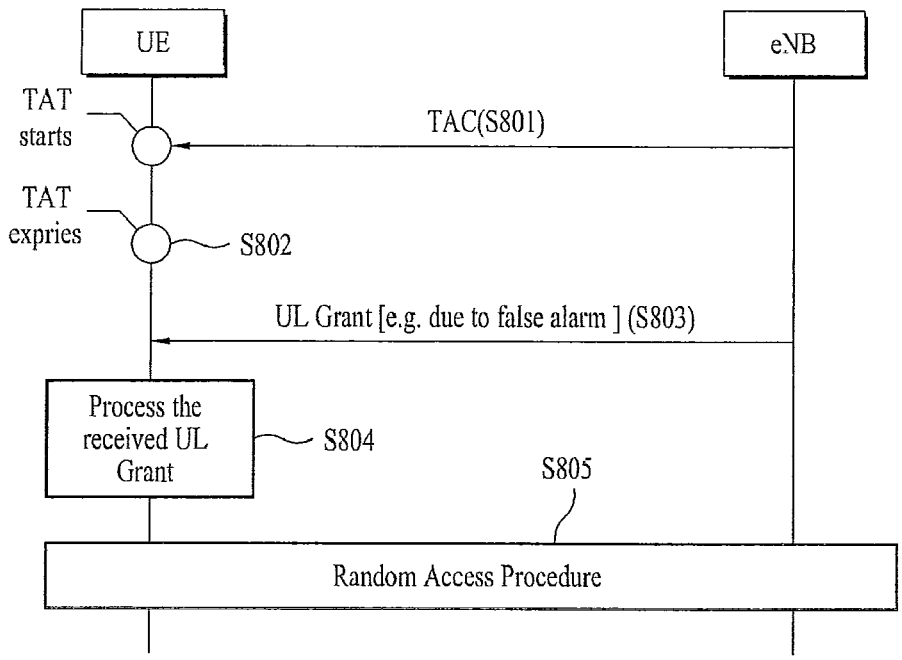
FIG. 8 illustrates the case where a terminal initiates a random access procedure when it has received a UL grant signal while a TAT of the terminal is not running.

FIG. 8 illustrates the case where a terminal initiates a random access procedure when it has received a UL grant signal while a TAT of the terminal is not running.

First, at step S801, the terminal may receive a TAC from a BS. This TAC corresponds to a MAC control element and can be received within a MAC PDU that the BS transmits to the terminal. Accordingly, the terminal can start or restart the TAT.

The TAT may expire if the terminal does not receive a new TAC from the BS for a predetermined time after the TAT starts (S802). In the example illustrated in FIG. 8, the terminal receives a UL grant signal from the BS while the TAT of the terminal is not running (S803). In another example, since the BS is aware of the time synchronization state of the terminal, the BS transmits a UL grant signal to the terminal only when the terminal is in time synchronization with the BS. However, when the terminal is not in time synchronization with the BS, the terminal may erroneously determine, due to false alarm, that a UL grant signal has been received from the BS. FIG. 8 illustrates the case where the terminal receives a UL grant signal while the TAT is not running or where the terminal erroneously determines that the terminal has received a UL grant signal from the BS due to false alarm.

In the case where the terminal determines at step S803 that a UL grant signal has been received from the BS as described above, the terminal processes the UL grant signal accordingly (S804), and the terminal initiates and performs a random access procedure as at step S805 in the case of an embodiment wherein the terminal is set to initiate a random access procedure when the terminal has received a UL grant signal from the BS while the TAT is not running.

However, in the case where the UL grant signal that the terminal has received at step S803 is due to false alarm as in the example of FIG. 8, an unnecessary random access procedure may be triggered, causing interference to other terminals. This may cause a problem in which wireless resources are wasted since an unnecessary random access procedure is performed.

Accordingly, a preferred embodiment of the present invention suggests that a terminal ignore a UL grant signal when the terminal receives the UL grant signal from a BS while a TAT of the terminal is not running. In the case where the BS requests that the terminal transmit an uplink signal, the BS may detect that the terminal is not in time synchronization with the BS and may then retransmit a TAC and, when the terminal receives a UL grant signal from the BS while the TAT of the terminal is running after restarting according to the TAC, the terminal may transmit an uplink signal in response to the UL grant signal.

Figure 9:
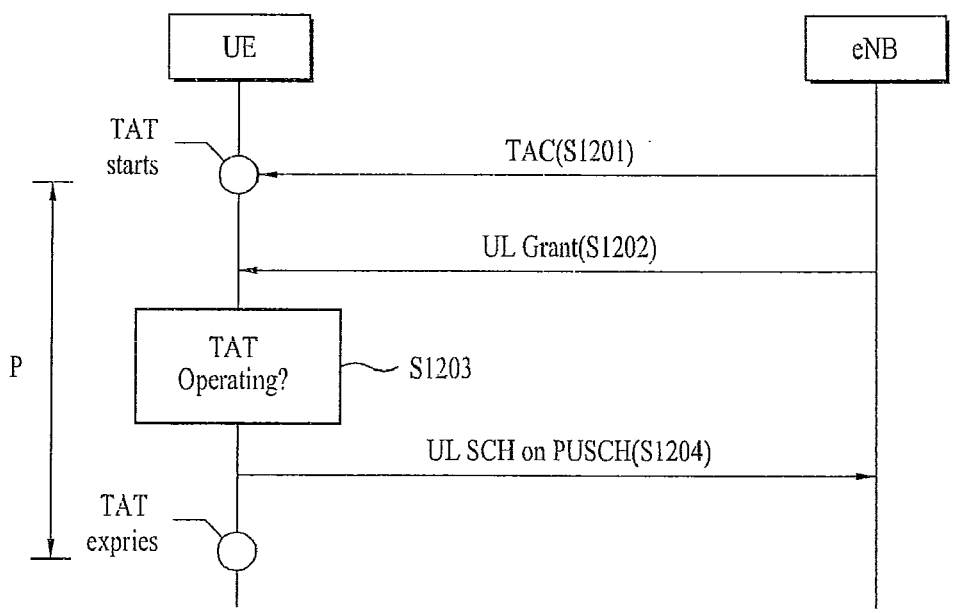
FIG. 9 illustrates a method in which the terminal transmits an uplink signal taking into consideration whether or not the TAT is running according to a preferred embodiment of the present invention.

FIG. 9 illustrates a method in which the terminal transmits an uplink signal taking into consideration whether or not the TAT is running according to a preferred embodiment of the present invention.

In the case where the terminal receives a TAC from the BS as at step S1201, the terminal may run its TAT for a predetermined time of, for example, P from the time at which the TAC is received. On the other hand, in the case where the terminal receives a UL grant signal from the BS (S1202), the terminal according to this embodiment determines whether or not the TAT of the terminal is currently running (S1203) and transmits an uplink signal (for example, a UL-SCH) corresponding to the received UL grant signal to the BS only when it is determined that the TAT of the terminal is running (S1204).

Figure 10:
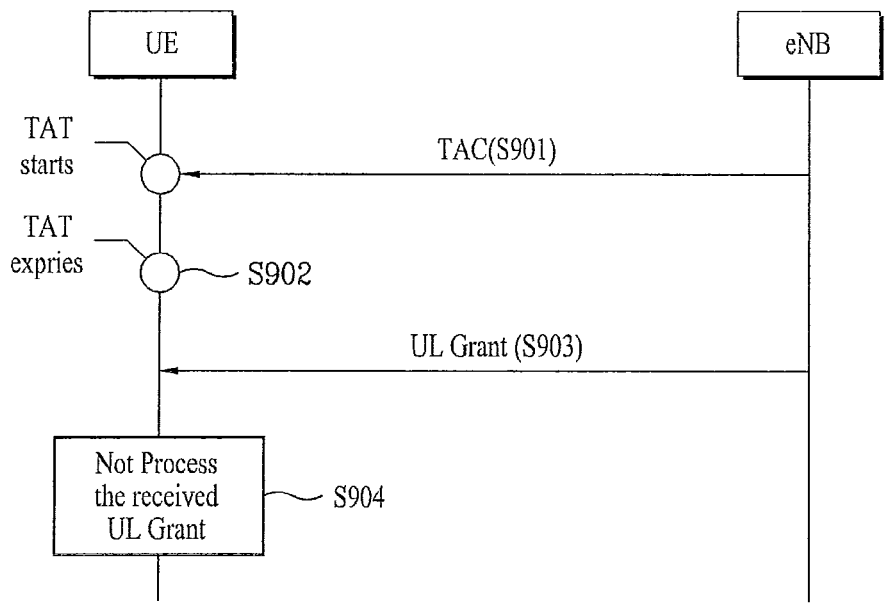
FIG. 10 illustrates a method for processing an uplink grant signal received when the TAT of the terminal is not running according to a preferred embodiment of the present invention.

FIG. 10 illustrates a method for processing a UL grant signal received when the TAT of the terminal is not running according to a preferred embodiment of the present invention.

First, at step S901, the terminal receives a TAC from the BS. Accordingly, the terminal can start or restart the TAT of the terminal. Thereafter, let us assume that the TAT of the terminal has expired at step S902 after a predetermined time elapses since no additional TAC is received.

The terminal may receive a UL grant signal from the BS while the terminal is not in time synchronization with the BS since the TAT has expired (S903). This may occur in the case where the BS transmits a UL grant signal since the BS erroneously determines the condition of the terminal or in the case where the terminal erroneously determines, due to false alarm, that a UL grant signal has been received.

In such a case, the terminal creates a MAC PDU by processing the received UL grant signal and attempts to transmit the MAC PDU as in the above embodiment. However, the terminal may trigger a random access procedure since it is not in time synchronization with the BS. Thus, this embodiment suggests that the terminal ignore a UL grant signal without processing the UL grant signal if it has received the UL grant signal while the TAT of the terminal is not running, i.e., when it is not in time synchronization with the BS. Here, the processing of the UL grant signal includes determining whether or not to perform retransmission according to HARQ information (for example, NDI information) included in the UL grant signal and then creating a MAC PDU for initial transmission/retransmission.

That is, this embodiment suggests that the terminal not create a MAC PDU and not trigger the random access procedure in response to the UL grant signal received at step S903.

Figure 11:
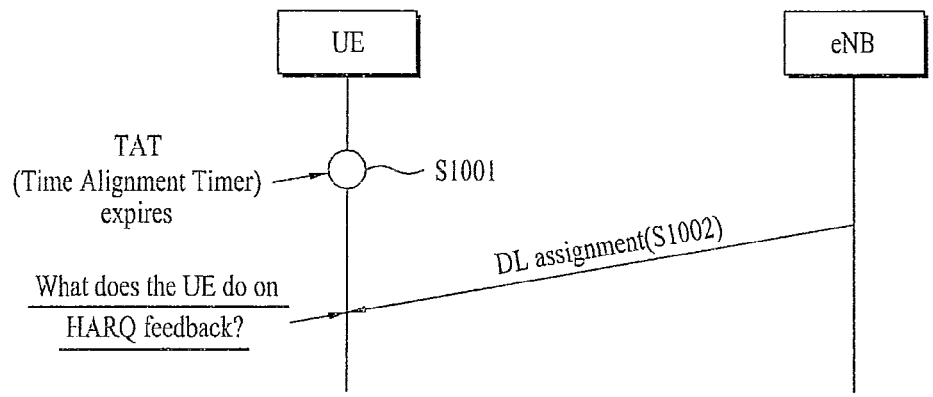
FIG. 11 illustrates a problem that occurs when the terminal receives a downlink allocation signal from the BS while the TAT is not running.

Another embodiment of the present invention addresses a processing problem that occurs when the terminal receives a DL allocation (or assignment) signal from the BS while the TAT of the terminal is not running, similar to the above example. FIG. 11 illustrates a problem that occurs when the terminal receives a DL allocation signal from the BS while the TAT is not running.

As shown in FIG. 11, the TAT expires at step S1001. Specifically, the terminal starts or restarts the TAT at the time at which a TAC is received from the BS and runs the TAC for a predetermined time from that time. The TAT of the terminal expires if no additional TAC is received until the predetermined time elapses. In this state, the terminal may receive a DL allocation signal from the BS (S1002). Here, the terminal may receive the DL allocation signal from the BS through a PDCCH and may receive a downlink signal through a PDSCH using wireless resources corresponding to the DL allocation signal.

In this case, the terminal may operate according to the following scenarios or schemes.

(1) A scheme in which the terminal receives a PDSCH according to the DL allocation signal received at step S1002 and triggers a random access procedure in order to transmit HARQ feedback information regarding the result of the reception of the PDSCH.

(2) A scheme in which the terminal receives a PDSCH according to the DL allocation signal received at step S1002 and does not transmit a HARQ feedback signal regarding the PDSCH reception.

In the case of scheme (1) among the two schemes, a random access procedure may be unnecessarily triggered due to false alarm or the like as described above with reference to FIG. 8. Accordingly, an embodiment of the present invention suggests that, in the case where the terminal receives a DL allocation signal while the TAT is not running, the terminal not transmit HARQ feedback information regarding the PDSCH processing result to the BS although the terminal receives and processes the PDSCH signal corresponding to the DL allocation signal.

In the case where the BS detects that the TAT of the terminal is not running, the BS may retransmit a TAC to cause the terminal to restart the TAT as described above. Thereafter, the BS may also retransmit the PDSCH.

Figure 12:
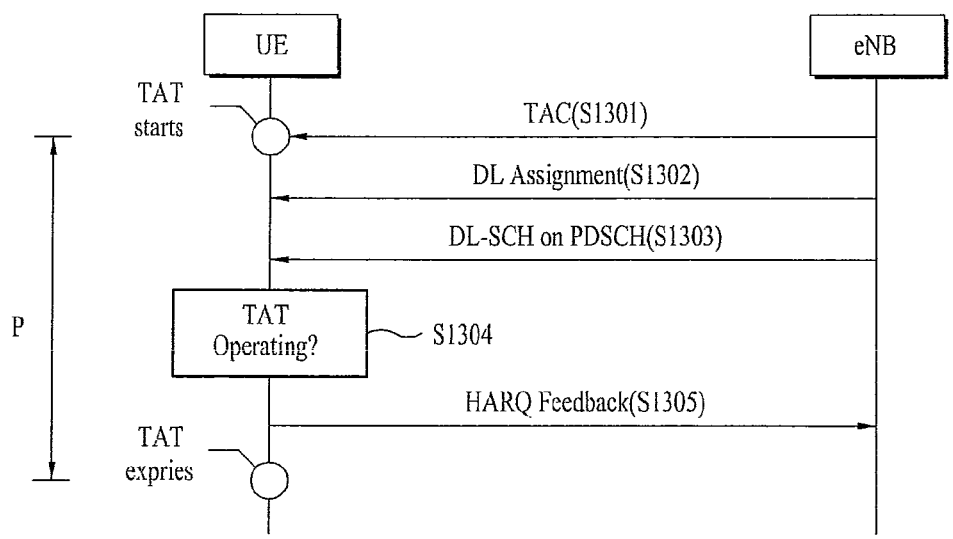
FIG. 12 illustrates a method in which a terminal receives a downlink signal taking into consideration whether or not a TAT of the terminal is running according to a preferred embodiment of the present invention.

FIG. 12 illustrates a method in which a terminal receives a downlink signal taking into consideration whether or not a TAT of the terminal is running according to a preferred embodiment of the present invention.

In the case where the terminal receives a TAC from a BS as at step S1301, the terminal may run the TAT for a predetermined time of, for example, P from the time at which the TAC is received. In the case where the terminal receives a DL allocation signal from the BS in this state (S1302), the terminal can receive a downlink signal (for example, a DL-SCH transmitted through a PDSCH) using wireless resources corresponding to the DL allocation signal (S1303). Generally, in the case where the terminal receives a DL-SCH through a PDSCH, the terminal generates HARQ feedback information such as an ACK/NACK according to the decoding result of the DL-SCH and feeds the generated information back to the BS. However, this embodiment suggests that the terminal determine whether or not the TAT of the terminal is currently running (S1304) and transmit HARQ feedback information according to the DL-SCH reception result to the BS only when it is determined that the TAT of the terminal is running (S1305).

Figure 13:
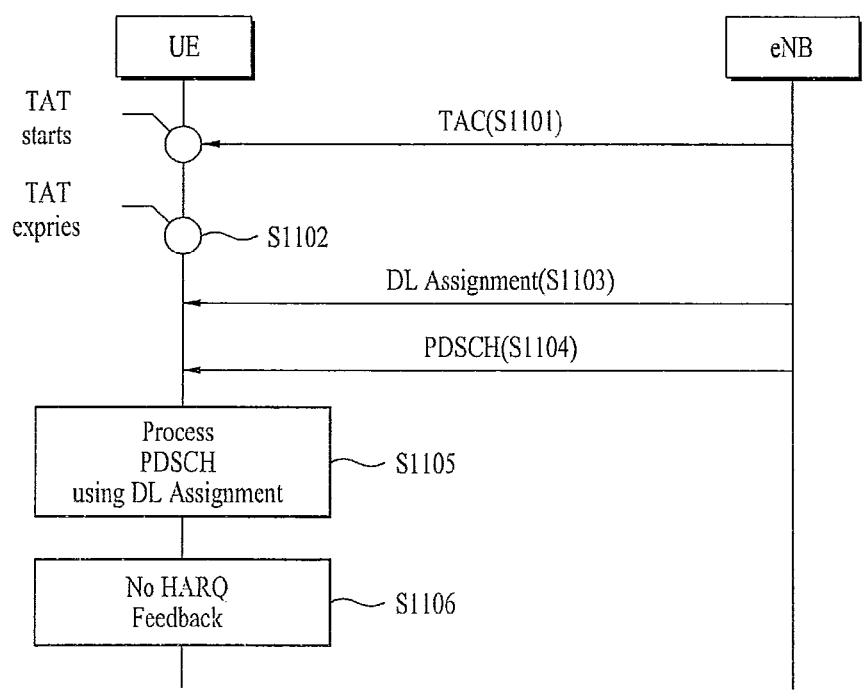
FIG. 13 illustrates a method for processing a downlink allocation signal received while the TAT of the terminal is not running according to a preferred embodiment of the present invention.

FIG. 13 illustrates a method for processing a DL allocation signal received while the TAT of the terminal is not running according to a preferred embodiment of the present invention.

First, at step S1101, the terminal receives a TAC from the BS. Accordingly, the terminal can start or restart the TAT of the terminal. Thereafter, let us assume that the TAT of the terminal has expired at step S1102 after a predetermined time elapses since no additional TAC is received.

The terminal may receive a DL allocation signal from the BS while the terminal is not in time synchronization with the BS since the TAT has expired (S1103). The terminal may also receive downlink data through wireless resources corresponding to the DL allocation signal in a PDSCH (S1104). In this case, the terminal according to this embodiment performs reception processing of the PDSCH according to the DL allocation signal received at step S1103 but does not transmit HARQ feedback information according to the reception result of the PDSCH to the BS (S1106).

Here, the reception processing of the PDSCH includes a process for decoding the PDSCH using HARQ-related information or the like received as a DL allocation signal and then generating an ACK/NACK according to the decoding result. However, this embodiment suggests that the terminal not feed the generated ACK/NACK signal to the BS while the TAT is not running. Specifically, this embodiment suggests that a MAC layer module of the terminal not transfer an ACK or NACK generated according to the PDSCH reception result to a physical layer module if the TAT of the terminal is not running.

The following is a description of the configuration of a terminal that performs the operations as described above.

Figure 14:
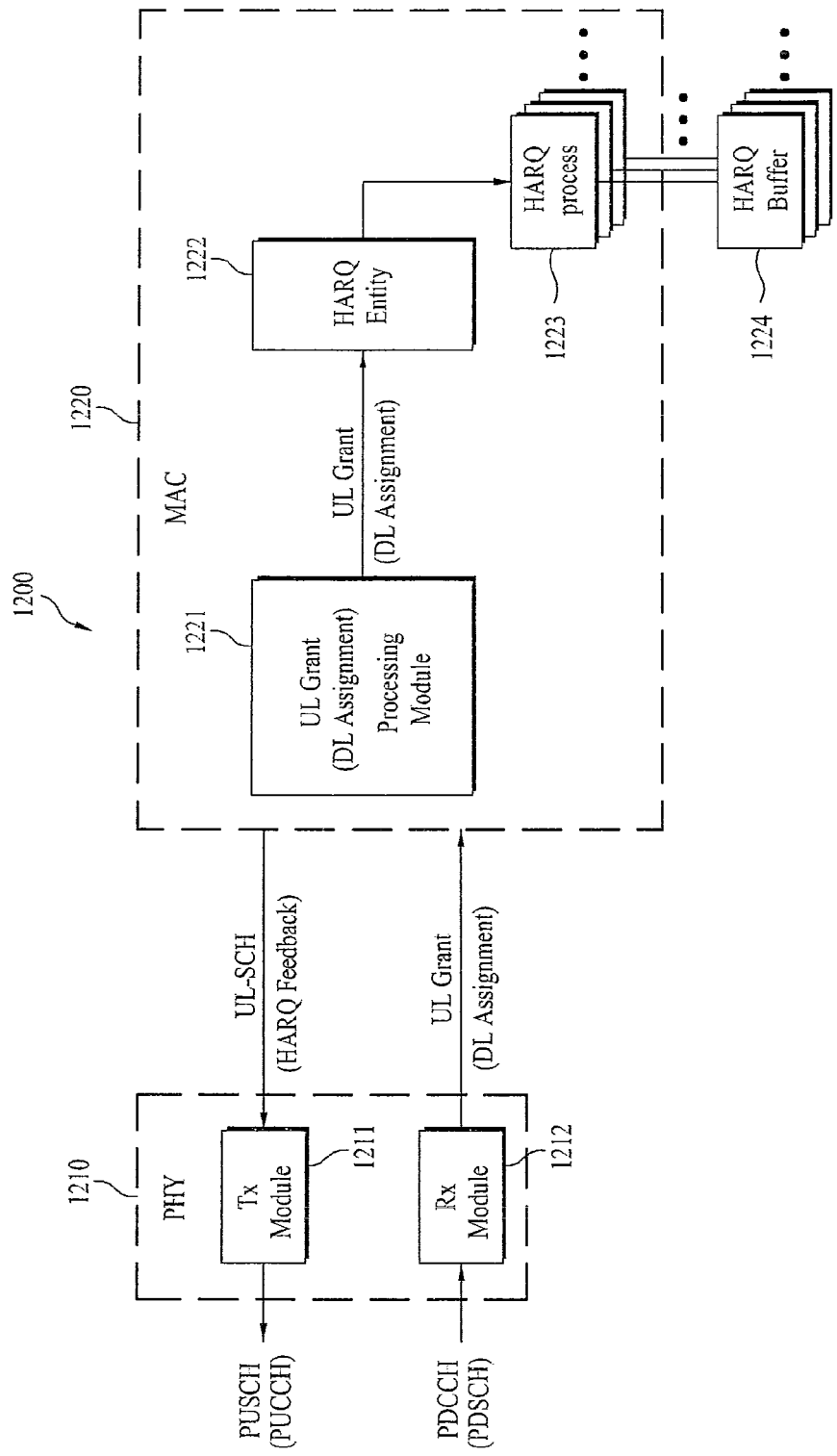
FIG. 14 illustrates the configuration of the terminal according to an embodiment of the present invention.

FIG. 14 illustrates the configuration of the terminal according to an embodiment of the present invention.

The terminal according to this embodiment may include an antenna (not shown) for signal transmission and reception, a memory (not shown) for storing data and information, and a processor 1200 for processing received signals or signals for transmission. FIG. 14 mainly illustrates the internal configuration of the processor 1200 for transmission/reception signal processing described above with reference to FIGS. 1 to 13.

The processor 1200 of the terminal according to this embodiment may be divided into a physical layer module 1210 for transmitting and receiving a physical signal to and from the BS and a MAC layer module 1220 for controlling signal transmission and reception of the physical layer module 1210.

Specifically, the physical layer module 1210 includes a transmission module 1211 for transmitting an uplink signal to the BS and a reception module 1212 for receiving a signal from the BS. The MAC layer module 1220 may include a processing module 1221 for processing a UL grant signal and/or a DL allocation signal, a HARQ entity 1222 for managing HARQ operations, and a plurality of HARQ processes 1223. Each of the HARQ processes 1223 may include a HARQ buffer 1224 corresponding to the HARQ process 1223. Although a UL grant processing module and a DL allocation processing module are simply illustrated as the single processing module 1221 in FIG. 14, the modules may be separately provided according to the selection of the designer. The UL grant processing module/DL allocation processing module 1221 does not need to be provided separately, provided that the MAC layer module 1220 is designed to perform the functionality of the UL grant processing module/DL allocation processing module 1221 shown in FIG. 14.

The following is a description of the operation of the terminal configured as described above in the case where a UL grant signal is received from a BS while the TAT of the terminal is not running.

In the case where the BS transmits a TAC for uplink time synchronization of the terminal, the reception module 1212 receives and transfers the TAC to the MAC layer module 1220. The MAC layer module 1220 runs the TAT for a predetermined time from the time at which the TAC is received. If the reception module 1212 receives a UL grant signal from the BS, the UL grant signal is transferred to the MAC layer module 1220, specifically to the UL grant processing module 1221. However, it is assumed that the UL grant processing module 1221 according to this embodiment performs processing associated with the reception of the UL grant signal only when the TAT of the terminal is running. That is, in the case where a UL grant signal is received while the TAT of the terminal is running, the UL grant processing module 1221 determines whether the received UL grant signal has been received through a random access response message or through a PDCCH indicated by a C-RNTI or a temporary C-RNTI of the terminal, sets an NDI value of HARQ feedback information of the UL grant signal, and transfers the processed UL grant signal to the HARQ entity 1222. Accordingly, the HARQ entity 1222 can instruct the HARQ process 1223 to perform initial transmission or retransmission and the HARQ process 1223 can manage data of a corresponding HARQ buffer 1224 and control the transmission module 1211 of the physical layer module 1210 to transmit an uplink signal to the BS.

However, this embodiment suggests that the UL grant processing module 1221 ignore the UL grant signal without performing the UL grant signal processing described above if the TAT of the terminal is not running. Thus, the UL grant signal is not transferred to the HARQ entity 1222 and processing for uplink transmission is not performed. Another preferred embodiment of the present invention suggests that the terminal be set not to trigger a random access procedure in the case where a UL grant signal is received while the TAT is not running. This prevents performance of an unnecessary random access procedure.

On the other hand, the following is a description of a processing procedure that is performed when the processor 1200 of the terminal configured as illustrated in FIG. 14 receives a DL allocation signal while the TAT of the terminal is not running.

In the case where the BS transmits a TAC for uplink time synchronization of the terminal, the reception module 1212 of the terminal receives and transfers the TAC to the MAC layer module 1220. The MAC layer module 1220 of the terminal runs the TAT for a predetermined time from the time at which the TAC is received. If the reception module 1212 receives a DL allocation signal from the BS, the DL allocation signal is transferred to the MAC layer module 1220, specifically to the DL allocation processing module 1221. Upon receiving the DL allocation signal, the DL allocation processing module 1221 controls the HARQ entity 1222 and the HARQ process 1223 to receive and process a downlink signal corresponding to the DL allocation signal information. Accordingly, the HARQ process 1223 can generate HARQ feedback information such as an ACK/NACK according to the result of reception of the downlink signal.

However, this embodiment suggests that the HARQ process 1223 not transfer the HARQ feedback information generated as described above to the physical layer module 1210 while the TAT of the terminal is not running. Accordingly, HARQ feedback information of the received PDSCH is not transmitted to the BS.

The present invention clearly defines a method for operating a terminal when the terminal receives an uplink grant signal and/or a downlink allocation signal from a base station while a TAT of the terminal is not running, thereby preventing malfunction of the terminal and improving system performance.

In addition, according to the present invention, a terminal can perform a communication procedure without malfunction in the case where a signal requesting uplink signal transmission and/or a downlink signal is received from a base station while uplink signal transmission timing of the terminal is incorrect.

Although the signal transmission/reception technology and the terminal configuration for the same according to the present invention have been described with reference to examples wherein they are applied to a 3GPP LTE system, they can also be applied to various other mobile communication systems having a similar procedure.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for a terminal to transmit an uplink signal, the method comprising:
   receiving a time alignment command from a base station;
   running a time alignment timer for a predetermined time after the time alignment command is received;
   receiving an uplink grant signal from the base station;
   determining whether the time alignment timer is running upon receiving the uplink grant signal; and
   performing an initial transmission or a retransmission of the uplink signal using a wireless resource based on the uplink grant signal only when the time alignment timer is running upon receiving the uplink grant signal,
   wherein the uplink grant signal is received through a Physical Downlink Control Channel (PDCCH) indicating a Cell Radio Network Temporary Identifier (C-RNTI) of the terminal.

2. The method according to claim 1, wherein the terminal ignores the uplink grant signal if the time alignment timer is not running when the uplink grant signal is received.

3. The method according to claim 2, further comprising:
   processing the uplink grant signal which is received while the time alignment timer is running,
   wherein the performing step performs the initial transmission or the retransmission of the uplink signal using the wireless resource based on the processed uplink grant signal only when the time alignment timer is running upon receiving the uplink grant signal.

4. The method according to claim 1, further comprising:
re-receiving the time alignment command from the base station and re-running the time alignment timer;
re-receiving the uplink grant signal from the base station while the time alignment timer is re-running; and
transmitting an uplink signal using a wireless resource corresponding to the re-received uplink grant signal.

5. The method according to claim 1, wherein the uplink grant signal received from the base station includes an uplink grant signal that the base station has actually transmitted and an uplink grant signal that the terminal erroneously detects due to a false alarm.

6. The method according to claim 1, further comprising:
processing the uplink grant signal which is received while the time alignment timer is running,
wherein the performing step performs the initial transmission or the retransmission of the uplink signal using the wireless resource based on the processed uplink grant signal only when the time alignment timer is running.

7. A method for a terminal to receive a downlink signal, the method comprising:
receiving a time alignment command from a base station;
running a time alignment timer for a predetermined time after the time alignment command is received;
receiving a downlink allocation signal from the base station;
receiving a downlink signal through a wireless resource based on the downlink allocation signal;
decoding the downlink signal;
generating HARQ feedback information according to a result of the decoding of the downlink signal;
determining, before a transmission of the generated HARQ feedback information, whether the time alignment timer is running; and
transmitting the generated HARQ feedback information to the base station only when the time alignment timer is running,
wherein the downlink allocation signal is received through a Physical Downlink Control Channel (PDCCH), and the downlink signal received through the wireless resource corresponding to the downlink allocation signal is received using a Physical Downlink Shared Channel (PDSCH).

8. The method according to claim 7, wherein the terminal does not transmit the generated HARQ feedback information to the base station when the time alignment timer is not running.

9. The method according to claim 7, further comprising:
processing the received downlink allocation signal regardless of whether the time alignment is running upon receiving the downlink allocation signal,
wherein receiving the downlink signal through the wireless resource receives the downlink signal based on the processed downlink allocation signal.

10. The method according to claim 7, wherein the receiving the downlink allocation signal receives the downlink allocation signal from the base station while the time alignment timer is not running, and
wherein the receiving the downlink signal through the wireless resource is received while the time alignment timer is not running.

11. A terminal for transmitting an uplink signal, the terminal comprising:
a physical layer module including a reception module configured to receive a time alignment command and an uplink grant signal from a base station and a transmission module configured to perform an initial transmission or a retransmission of the uplink signal; and
a MAC layer module configured to control a time alignment timer to run for a predetermined time from a time at which the time alignment command is received by the reception module, determine whether the time alignment timer is running upon receiving the uplink grant signal, and control the transmission module to perform the initial transmission or the retransmission of the uplink signal using a wireless resource based on the uplink grant signal only when the time alignment timer is running upon receiving the uplink grant signal,
wherein the physical layer module is further configured to receive the uplink grant signal through a Physical Downlink Control Channel (PDCCH) indicating a Cell Radio Network Temporary Identifier (C-RNTI) of the terminal.

12. The terminal according to claim 11, wherein the MAC layer module is designed to ignore the uplink grant signal received by the reception module if the time alignment timer is not running when the uplink grant signal is received by the reception module.

13. The terminal according to claim 12, wherein the MAC layer module includes a HARQ entity and a plurality of HARQ processes managed by the HARQ entity, the MAC layer module transfers the uplink grant signal received by the reception module to the HARQ entity only when the time alignment timer is running, and the HARQ entity is designed to cause a HARQ process, corresponding to a time at which the uplink grant signal is received, to transmit the uplink signal through the transmission module.

14. The terminal according to claim 12, wherein the MAC layer module is further configured to process the uplink grant signal which is received while the time alignment timer is running, and control the transmission module to perform the initial transmission or the retransmission of the uplink signal using the wireless resource based on the processed uplink grant signal only when the time alignment timer is running upon receiving the uplink grant signal.

15. The terminal according to claim 11, wherein the MAC layer module is further configured to process the uplink grant signal which is received while the time alignment timer is running, and control the transmission module to perform the initial transmission or the retransmission of the uplink signal using the wireless resource based on the processed uplink grant signal only when the time alignment timer is running.

16. A terminal for receiving a downlink signal, the terminal comprising:
a physical layer module including:
a reception module configured to receive a time alignment command and a downlink allocation signal from a base station and to receive a downlink signal from the base station through wireless resources based on the downlink allocation signal, and
a transmission module configured to transmit HARQ feedback information according to a result of the reception of the downlink signal; and
a MAC layer module configured to:
control a time alignment timer to run for a predetermined time from a time at which the time alignment command is received by the reception module,
perform a decoding of the downlink signal,
generate the HARQ feedback information according to a result of the decoding of the downlink signal,
determine, before a transmission of the generated HARQ feedback information, whether the time alignment timer is running, and control the transmission module not to transmit the generated HARQ feedback information when the time alignment timer is not running, wherein the downlink allocation signal is received through a Physical Downlink Control Channel (PDCCH), and the downlink signal received through the wireless resources corresponding to the downlink allocation signal is received using a Physical Downlink Shared Channel (PDSCH).

17. The terminal according to claim 16, wherein the MAC layer module does not transfer the generated HARQ feedback information to the physical layer module when the time alignment timer is not running.

18. The terminal according to claim 16, wherein the MAC layer module controls the transmission module to perform signal transmission to the base station through an uplink only when the time alignment timer is running.

19. The terminal according to claim 16, wherein the MAC layer module is further configured to process the received downlink allocation signal regardless of whether the time alignment is running upon receiving the downlink allocation signal, and control the reception module to receive the downlink signal through the wireless resources based on the processed downlink allocation signal.

20. The terminal according to claim 16, wherein the reception module is further configured to receive the downlink allocation signal from the base station while the time alignment timer is not running, and wherein the reception module is further configured to receive the downlink signal through the wireless resources while the time alignment timer is not running.

* * * * *